(No Model.)

T. E. FRY.
ANIMAL TRAP.

No. 488,996. Patented Jan. 3, 1893.

Witnesses
E. K. Stewart.
N. J. Riley.

Inventor
Thomas E. Fry.

By his Attorneys,
C. A. Snow & Co.

UNITED STATES PATENT OFFICE.

THOMAS EDWARD FRY, OF NIPOMO, CALIFORNIA.

ANIMAL-TRAP.

SPECIFICATION forming part of Letters Patent No. 488,996, dated January 3, 1893.

Application filed August 25, 1892. Serial No. 444,083. (No model.)

*To all whom it may concern:*

Be it known that I, THOMAS EDWARD FRY, a citizen of the United States, residing at Nipomo, in the county of San Luis Obispo and State of California, have invented a new and useful Animal-Trap, of which the following is a specification.

The invention relates to improvements in animal traps.

The object of the present invention is to provide a simple and inexpensive trap adapted for burrowing animals, and designed to be inserted in the holes of such animals, and capable of being readily bent or twisted to conform to the shape of the hole.

The invention consists in the construction and novel combination and arrangement of parts hereinafter fully described, illustrated in the accompanying drawings and pointed out in the claims hereto appended.

Figure 1:
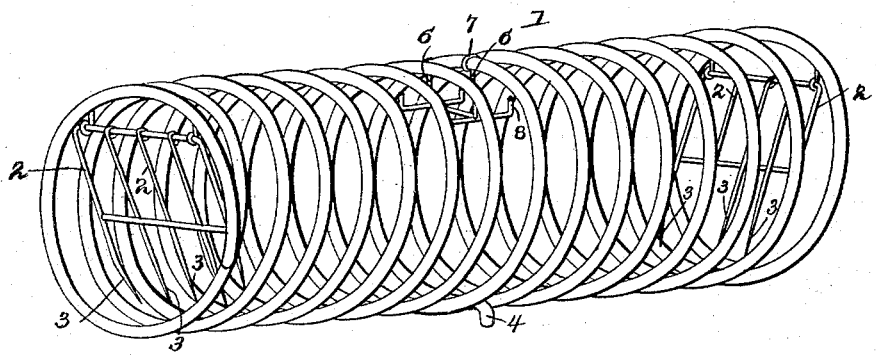
Figure 2:
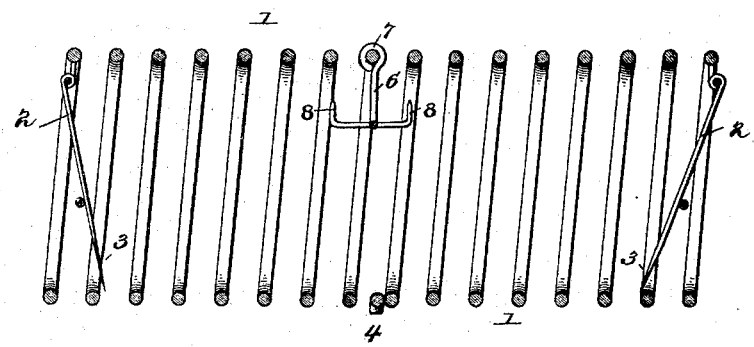
Figure 3:
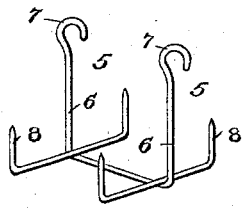

In the drawings—Figure 1 is a perspective view of a trap constructed in accordance with this invention. Fig. 2 is a longitudinal sectional view. Fig. 3 is a detail perspective view of the bait holder.

Like numerals of reference indicate corresponding parts in all the figures of the drawings.

1 designates a cylindrical spiral spring forming the body or casing of the trap, and provided at its ends with depending slanting doors 2, which are hinged at the top and incline inward and are provided at the bottom with a series of points 3, whereby an animal in partially opening a door will pass the points and be prevented thereby from backing out of the trap, and will be compelled to enter the same. The spiral spring which forms the body of the trap, is designed to be inserted in the hole of a burrowing animal; it is flexible and may be bent or twisted in any manner to conform to the configuration of the hole, and in case of the trap being used in a vertical hole, the upper end of the trap may be bent over sufficiently to bring the hinged door in operative position.

The trap is prevented turning by feet 4 which are formed by downwardly bent ends of a curved piece of wire secured transversely of the spiral spring to the lower portion of one of the coils.

The bait for attracting animals is placed on a bait holder 5 which is suspended from the upper side of one of the coils. The bait holder consists of a U-shaped supporting piece 6 provided at the ends with eyes 7 to receive the coil from which the bait holder is suspended, and a pair of parallel U-shaped hooks 8 secured transversely of the supporting piece and arranged longitudinally of the trap, and adapted to receive a suitable bait on their upturned ends.

From the foregoing description and the accompanying drawings, the advantages of the invention will be readily understood.

What I claim is—

1. An animal trap comprising a cylindrical spiral spring adapted to be inserted in a hole and to conform to the configuration of the same, the inclined doors closing the ends of the spring and hinged at the top and provided at the bottom with points, and a bait holder arranged within the spring, substantially as described.

2. A trap comprising the flexible spiral spring adapted to be inserted in a hole and to conform to the configuration of the same, and provided with teeth to prevent it turning, inclined doors hinged at the top and closing the ends of the spring and provided at the bottom with points, and a suspended bait holder arranged within the spring and composed of a U-shaped supporting piece provided at the ends with eyes receiving a coil, and the parallel U-shaped hooks secured at their centers to the supporting piece and arranged transversely of the same, substantially as described.

In testimony that I claim the foregoing as my own I have hereto affixed my signature in the presence of two witnesses.

THOMAS EDWARD FRY.

Witnesses:
LEO WOOD,
EDWARD KNOTTS.